United States Patent
Xu et al.

(10) Patent No.: US 12,462,691 B2
(45) Date of Patent: Nov. 4, 2025

(54) METHOD AND APPARATUS FOR PATH REPORTING

(71) Applicant: Lenovo (Beijing) Limited, Beijing (CN)

(72) Inventors: Min Xu, Haidian District (CN); Haiming Wang, Xicheng District (CN); Jing Han, Chaoyang District (CN); Jie Hu, Changping District (CN)

(73) Assignee: Lenovo (Beijing) Limited, Beijing (CN)

( * ) Notice: Subject to any disclaimer, the term of this patent is extended or adjusted under 35 U.S.C. 154(b) by 401 days.

(21) Appl. No.: 18/028,350

(22) PCT Filed: Sep. 25, 2020

(86) PCT No.: PCT/CN2020/117806
§ 371 (c)(1),
(2) Date: Mar. 24, 2023

(87) PCT Pub. No.: WO2022/061731
PCT Pub. Date: Mar. 31, 2022

(65) Prior Publication Data
US 2023/0401963 A1    Dec. 14, 2023

(51) Int. Cl.
*G01S 5/02*    (2010.01)
*G08G 5/21*    (2025.01)
*G08G 5/26*    (2025.01)
*G08G 5/55*    (2025.01)
*G08G 5/56*    (2025.01)
*G08G 5/57*    (2025.01)
*G08G 5/72*    (2025.01)
(Continued)

(52) U.S. Cl.
CPC .............. *G08G 5/26* (2025.01); *G08G 5/21* (2025.01); *G08G 5/55* (2025.01); *G08G 5/56* (2025.01); *G08G 5/57* (2025.01); *G08G 5/727* (2025.01)

(58) Field of Classification Search
CPC .. G08G 5/26; G08G 5/21; G08G 5/57; G08G 5/56; G08G 5/727; G08G 5/55
USPC ...................................... 455/456.1
See application file for complete search history.

(56) References Cited

U.S. PATENT DOCUMENTS

2016/0247404 A1* 8/2016 Srivastava ............. G08G 5/723
2016/0293018 A1* 10/2016 Kim ........................ G08G 5/53
(Continued)

FOREIGN PATENT DOCUMENTS

| CN | 108490976 A | 9/2018 |
| CN | 111095153 A | 5/2020 |

OTHER PUBLICATIONS

IP.com search History (Year: 2025).*
(Continued)

*Primary Examiner* — Moustapha Diaby
(74) *Attorney, Agent, or Firm* — FIG. 1 Patents

(57) ABSTRACT

The present application relates to a method and an apparatus for path reporting. One embodiment of the subject application provides a method performed by a primary user equipment (UE) in a UE group, comprising: receiving one or more secondary path reports, each including a secondary path of a corresponding secondary UE in the UE group; determining a group path report based on a primary path of the primary UE and/or the one or more secondary paths; and transmitting the group path report to a Base Station (BS).

20 Claims, 6 Drawing Sheets

(51) Int. Cl.
*H04W 4/02* (2018.01)
*H04W 64/00* (2009.01)

(56) References Cited

U.S. PATENT DOCUMENTS

| | | |
|---|---|---|
| 2017/0048925 A1 | 2/2017 | Song et al. |
| 2017/0229029 A1* | 8/2017 | Klinger .................. H01Q 3/28 |
| 2018/0074520 A1 | 3/2018 | Hong-Tao et al. |
| 2019/0051193 A1* | 2/2019 | Gutierrez ................ G08G 5/21 |

OTHER PUBLICATIONS 20954583.9 , "Extended European Search Report", EP Application No. 20954583.9, Jul. 12, 2024, 8 pages.
PCT/CN2020/117806 , "International Preliminary Report on Patentability", PCT Application No. PCT/CN2020/117806, Apr. 6, 2023, 6 pages.
PCT/CN2020/117806 , "International Search Report and Written Opinion", PCT Application No. PCT/CN2020/117806, Jun. 24, 2021, 7 pages.

* cited by examiner

METHOD AND APPARATUS FOR PATH REPORTING

TECHNICAL FIELD

The subject disclosure relates to wireless communication, and more particularly, the subject disclosure relates to a method and an apparatus for path reporting.

BACKGROUND OF THE INVENTION

A swarm of Unmanned Aerial Vehicles (UAVs) is a set of aerial robots, i.e., drones that work together to achieve a specific goal. Each UAV in the swarm may have a specific flight path to achieve the goal. With the development of automatic flight control and formation technology, the UAVs in the swarm may extend their service capability in a coordinated manner with little or no controller intervention. In order to enhance the mobility management of the UAVs, it is required to report the flight path of the UAVs to a Base Station (BS).

Currently, each UAV in a swarm transmits a flight path to the BS, however, the UAVs in the same swarm might have similar paths, which renders the flight path reports duplicated and unnecessary. In addition, each UAV transmitting a flight path to the BS might cause high signaling overhead.

Similarly, for a group of unmanned vehicles achieving a task, they might have similar travel paths, thus it might be unnecessary for each unmanned vehicle to transmit its individual travel path to the BS.

SUMMARY

Accordingly, it is desirable to provide a solution for reporting the paths more efficiently.

One embodiment of the subject application provides a method performed by a primary user equipment (UE) in a UE group, comprising: receiving one or more secondary path reports, each including a secondary path of a corresponding secondary UE in the UE group; determining a group path report based on a primary path of the primary UE and/or the one or more secondary paths; and transmitting the group path report to a Base Station (BS).

Another embodiment of the subject application provides a method performed by a BS, comprising: transmitting a path report configuration or a path report request, wherein the path report configuration or a path report request includes a path report type; and receiving one or more path reports.

Yet another embodiment of the subject application provides a method performed by a secondary UE in a UE group, comprising: determining a destination based on a location requirement and/or a radio link condition; and transmitting a secondary path report to the destination.

Still another embodiment of the subject application provides an apparatus, comprising: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method performed by a primary UE in a UE group, comprising: receiving one or more secondary path reports, each including a secondary path of a corresponding secondary UE in the UE group; determining a group path report based on a primary path of the primary UE and/or the one or more secondary paths; and transmitting the group path report to a BS.

DETAILED DESCRIPTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

A swarm or a group of Unmanned Aerial Vehicles (UAVs) is a set of aerial robots i.e., drones that work together to achieve a specific goal. Each UAV in a swarm is propelled by a specific number of rotors and has the ability to vertically hover, take-off, and land (VTOL). The flight path of the UAVs is controlled either manually, i.e., by remote control operations, or autonomously by using processors deployed on the UAVs.

Applications of UAVs have been fast growing during the past few years. However, traditional UAV systems mainly rely on simple direct communication between the UAV and the ground pilot over an unlicensed spectrum (e.g., ISM (Industrial Scientific Medical) 2.4 GHz), which is typically of low data rate, unreliable, insecure, vulnerable to interference, difficult to monitor and manage, and has a very short operation range. To overcome the above limitations, there has been significant interest in integrating UAVs into cellular networks, e.g., 4G or 5G networks.

Currently, there have been a lot of activities in 3GPP to ensure that the 4G or 5G system will meet the connectivity needs of UAVs. During this phase, flight path reporting was introduced as an important capability of the UAV UEs, e.g., for mobility management. With this feature E-UTRAN (Evolved UMTS Terrestrial Radio Access Network) can request a UAV UE to report flight path information consisting of a number of waypoints defined as 3D locations and corresponding time stamps. A UE reports waypoints and time stamps per waypoint if available at the UE.

At present, 3GPP specifications only support basic reporting of a single UAV UE with a single path plan consisting of coordinates and time as waypoints.

Figure 1:
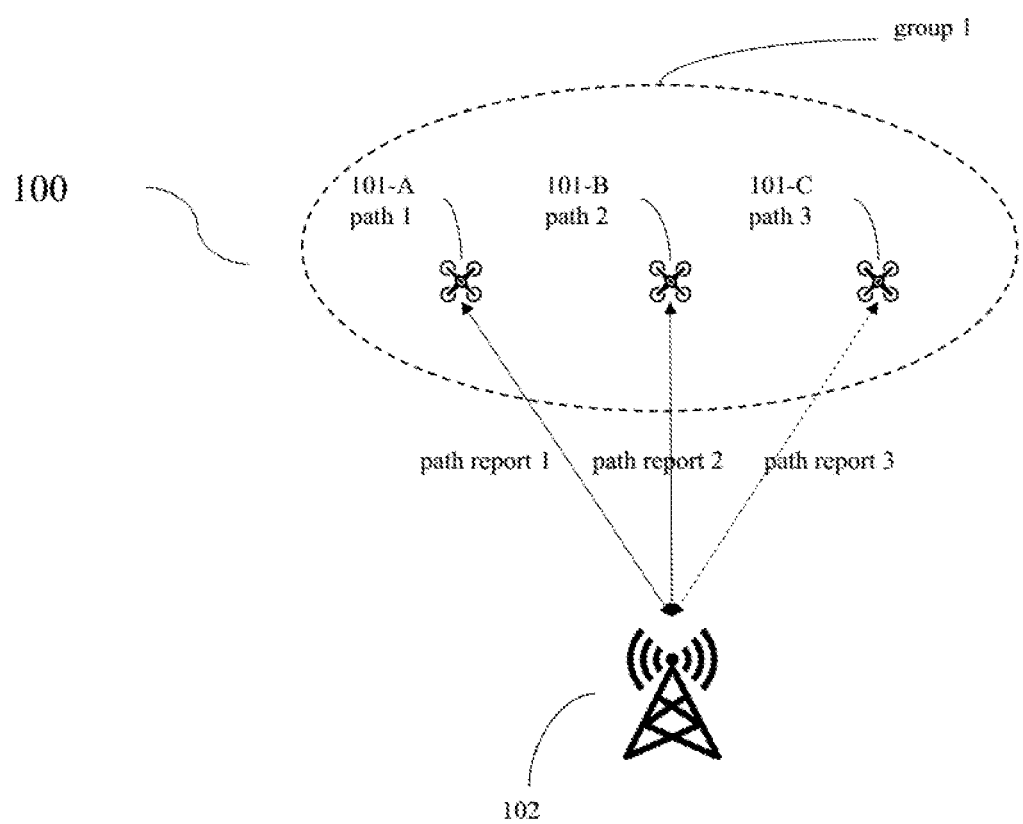
FIG. 1 illustrates a schematic diagram of a wireless communication system.

FIG. 1 illustrates a schematic diagram of a wireless communication system, i.e. an Unmanned Aerial System (UAS) 100. In FIG. 1, the wireless communication system 100 includes a UE group, group 1, which includes UE 101-A, UE 101-B, UE 101-C, and BS 102. Even though a specific number of UEs and BS are depicted in FIG. 1, persons skilled in the art will recognize that any number of UEs and BSs may be included in the wireless communication system 100.

The UEs may include UAVs, unmanned vehicles, or other user equipment, which are grouped together to achieve a specific goal. The UEs may communicate directly with the BS 102 via uplink (UL) communication signals, and the UEs may also communicate with each other via sidelink.

The BSs 102 may be distributed over a geographic region. In certain embodiments, each of the BSs 102 may also be referred to as an access point, an access terminal, a base, a macro cell, a Node-B, an enhanced Node B (eNB), a gNB, a Home Node-B, a relay node, or any device described using other terminology used in the art. The BSs 102 are generally parts of a radio access network that may include one or more controllers communicably coupled to one or more corresponding BSs 102.

The wireless communication system 100 is compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3rd Generation Partnership Project (3GPP)-based network, a 3GPP 5G network, a satellite communications network, a high altitude platform network, and/or other communications networks.

In some embodiments, the wireless communication system 100 is compatible with the 5G new radio (NR) of the 3GPP protocol, wherein the BS s 102 transmit data using an orthogonal frequency division multiplexing (OFDM) modulation scheme on the downlink and the UEs transmit data on the uplink using a Discrete Fourier Transform-Spread-Orthogonal Frequency Division Multiplexing (DFT-S-OFDM) or a Cyclic Prefix-Orthogonal Frequency Division Multiplexing (CP-OFDM) scheme. More generally, the wireless communication system 100 may implement some other open or proprietary communication protocols, for example, WiMAX, among other protocols.

In some other embodiments, the BS 102 may communicate using other communication protocols, such as the IEEE 802.11 family of wireless communication protocols. Further, in some embodiments, the BS 102 may communicate over licensed spectrums, whereas in other embodiments the BS 102 may communicate over unlicensed spectrums. The present disclosure is not intended to be limited to the implementation of any particular wireless communication system architecture or protocol. In another embodiment, the BS 102 may communicate with the UEs using 3GPP 5G protocols.

In FIG. 1, the BS 102 configures each of the UE 101-A, the UE 101-B, and the UE 101-C in the group to report its path to the BS 102 individually. Then UE 101-A transmits path report 1 based on path 1 to the BS 102, the UE 101-B transmits path report 2 based on path 2 to the BS 102, and the UE 101-C transmits path report 3 based on path 3 to the BS 102.

The UE 101-A, the UE 101-B, and the UE 101-C may be grouped to achieve the same or similar task, which means path 1, path 2, and path 3 may be similar to each other. Therefore, reporting similar paths may be duplicated and unnecessary, which would also cause high signaling overhead. Furthermore, some UEs may not have a cellular connection with the BS, but have a sidelink connection with other UEs in the group, thus these UEs cannot transmit path reports to the BS. For example, assuming that there is an obstacle between the UE 101-C and the BS 102, thus the UE 101-C does not have an uplink connection to the BS 102, and thus cannot transmit path report 3 to the BS 102.

One of the purposes of the present disclosure aims to solve the above defects.

Figure 2:
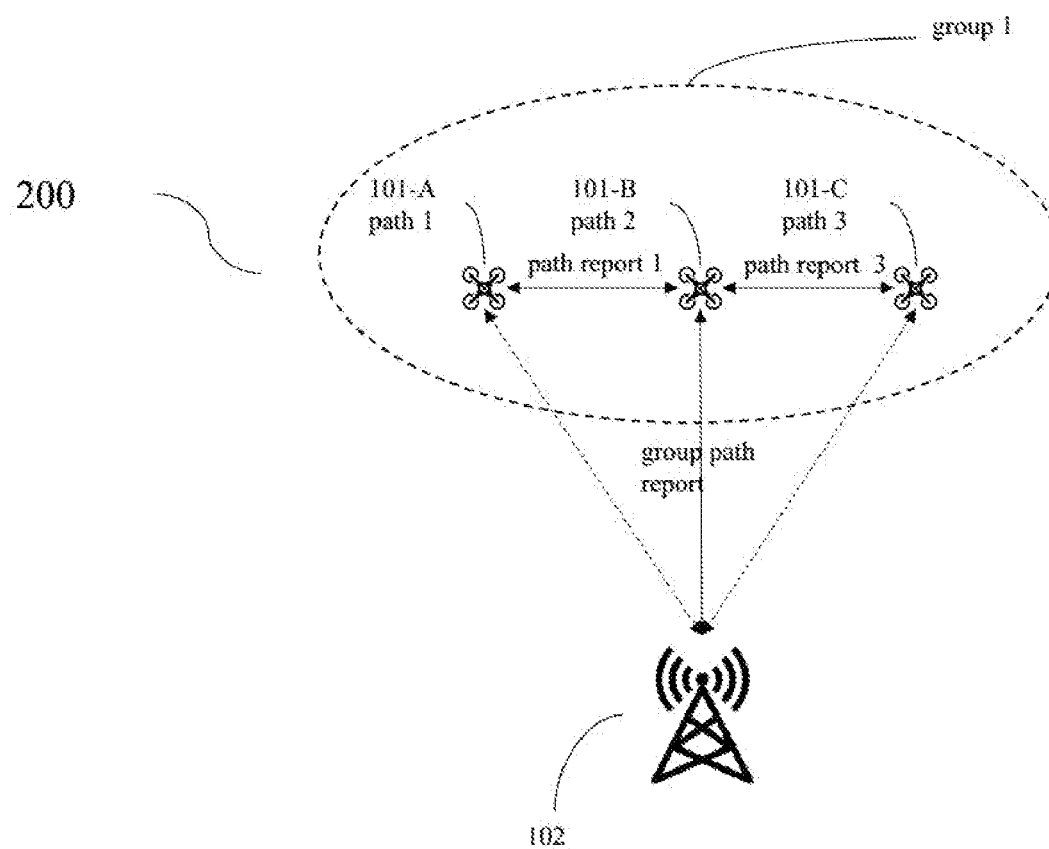
FIG. 2 illustrates a schematic diagram of a wireless communication system in accordance with some embodiments of the subject disclosure.

FIG. 2 illustrates a schematic diagram of a wireless communication system 200 in accordance with some embodiments of the subject disclosure.

In FIG. 2, there are three UEs in the UE group 1, UE 101-A, UE 101-B, and UE 101-C. The UE 101-B may be or include a primary UE, a master UE, or the like. The UE 101-A and the UE 101-C may be or include secondary UEs, member UEs, or the like. Each UE has its own path. The path of the primary UE can be referred to as a primary path, and the path of the secondary UE can be referred to as a secondary path. In FIG. 2, the primary path is path 2 of the primary UE 101-B, the secondary paths include path 1 of the secondary UE 101-A and path 3 of the secondary UE 101-C.

The path report determined by the primary UE and transmitted to the BS can be referred to as the group path report. Other names of the path reports also apply in the subject disclosure, and the subject disclosure has no intention of limiting the same.

The primary UE may control the secondary UEs, for example, the primary UE may transmit a path report configuration or a path report request to the secondary UEs. After receiving the path report configuration or the path report request, the secondary UEs can transmit the secondary path reports to the primary UE via sidelink.

After receiving the secondary path reports from the secondary UEs, the primary UE may determine the group path report based on the secondary paths, as well as the path of the primary UE itself, and transmit the group path report to the BS. In other embodiments, the primary UE may determine the group path report only based on the secondary path reports from the secondary UEs. In other embodiments, the primary UE may determine the path report only based on the primary path.

The group path report may be or include a combination of the received secondary path reports, as well as the primary path report. In other words, the group path report includes all the secondary paths and the primary path. For example, the group path report includes path 1, path 2, and path 3 in FIG. 3. Alternatively, the path report may be or include a common path, or a reference path for the group. In some embodiments, the common path or the reference path can be obtained or derived based on the primary path and the secondary paths. The primary UE reports the common path or the reference path for the group using a legacy mechanism, that is, the primary UE reports a single path that only consists of coordinates and time.

Figure 3:
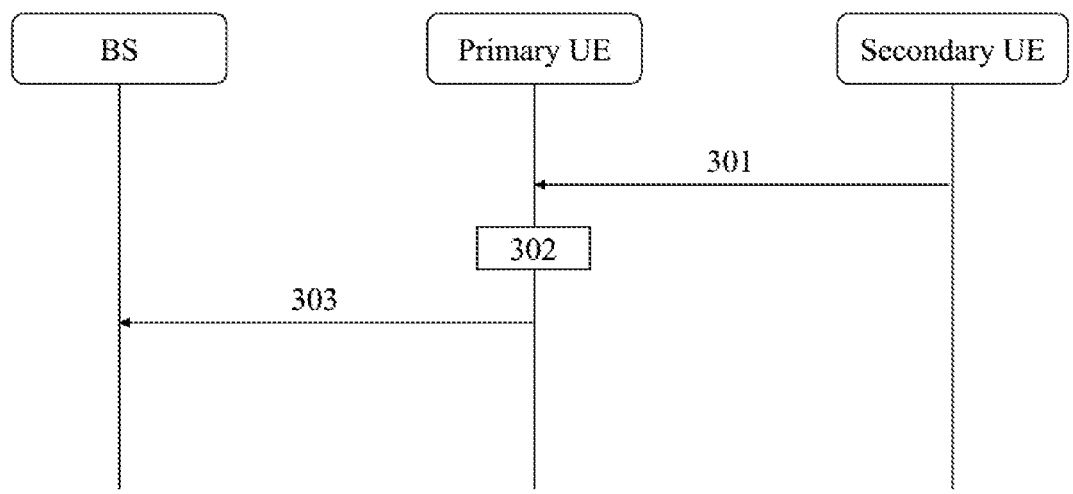
FIG. 3 illustrates a method performed by a primary UE according to some embodiments of the subject disclosure.

FIG. 3 illustrates a method performed by a primary UE according to a preferred embodiment of the subject disclosure.

In step 301, the primary UE receives one or more secondary path reports, each path report includes a secondary path of a corresponding secondary UE in the UE group.

In step 302, the primary UE determines a group path report based on a primary path of the primary UE and/or the one or more secondary paths.

In step 303, the primary UE transmits the group path report to the BS. The group path report may be transmitted via a dedicated signaling.

The primary UE and the secondary UEs may receive a path report configuration or a path report request from the BS, which is transmitted in a system information block (SIB) or dedicated singling, e.g., RRC signaling. For the secondary UEs, they may receive a path report configuration or a path report request from the primary UE, which is transmitted in a sidelink broadcasted signal or dedicated singling, e.g., PC5-RRC signaling. For the primary UE, when it receives the path report configuration or the path report request from the BS, it may forward the configuration or the request to the secondary UEs; alternatively, the primary UE may generate the path report configuration or the path report request, and transmit it to the secondary UEs.

The group path report transmitted by the primary UE to the BS may be a combination of the received secondary path(s), as well as the primary path, that is, the group path report includes all the secondary paths and the primary path. Specifically, for each path, the group path report may include at least one of the following parameters: location information of one or more waypoints, the time to arrive at the waypoints, and the time interval between the waypoints. The group path report may also include the QoS (Quality of Service) or QoE (Quality of Experience) requirement, the intended network slices of the path or between waypoints for each path.

Alternatively, the path report may be a common path, or a reference path for the group, which is determined based on the secondary paths and/or the primary path. In particular, the common path or the reference path may include at least one of the following parameters: location information of one or more waypoints, the time to arrive at the waypoints, and the time interval between the waypoints, and the spatial scale for the common path or the reference path. The common path or the reference path may also include the QoS or QoE requirement, the intended network slices of the path or between waypoints for the common path or the reference path.

The primary UE may also transmit the total number of UEs in the UE group, the total number of UEs with a path in the group, or the total number of UEs with paths to report in the group. The primary UE may further transmit the identities of the UEs in the UE group, the identities of the UEs with a path in the group, or the identities of the UEs with paths to report in the group.

In one embodiment, the UEs may also transmit an indicator to indicate the capability of path reporting to the BS or to other UEs. For the primary UE, it is capable of transmitting at least three types of path report: 1) an individual path report, i.e., the primary path report of the primary UE itself; 2) multiple path reports, i.e., the primary path report and/or secondary path reports; and 3) a common or reference path report. For the secondary UEs, they are capable of transmitting individual path reports, and they may transmit an indicator indicating their capabilities to the BS or to the primary UE.

The UEs may also transmit an indicator to indicate the availability of path reports to the BS or to other UEs. For the primary UE, it may indicate to the BS that any one of the above mentioned three types of path report is available. For the secondary UE, it may indicate to the primary UE, or to the BS, that the individual path report is available.

The group path report may be transmitted by the primary UE when the primary UE receives the path report configuration or the path report request from the BS. The path report configuration or the path report request may include at least one of the following parameters: 1) a path report type; 2) a group identity; 3) a number of UEs; 4) an identity of the UE; and/or 5) conditions.

The first parameter, the path report type includes at least three types of path report, which are: 1) an individual path report; 2) multiple path reports; and 3) a common or reference path report. When a UE receives a path report configuration or a path report request includes the first path report type, since the primary UE and the secondary UE are both able to transmit the individual path report, thus the primary UE and the secondary UE can transmit the individual path report. In one preferred embodiment, the secondary UE transmits the individual path report to the primary UE.

When a UE receives a path report configuration or a path report request including the second or the third path report type, since only the primary UE is able to transmit these two types of path reports, then only the primary UE transmits the path report to the BS.

For the second parameter, a group identity, when a UE receives a path report configuration or a path report request with the group identity, the UE can check whether it is in the UE group with the group identity. If yes, the UE can transmit the path report, if not, the UE does not need to transmit the same. For example, in FIG. 2, group 1 includes the UE 101-A, the UE 101-B, and the UE 101-C. The BS broadcasts a path report configuration or a path report request including the group identity: group 2. Thus, after receiving this path report configuration or path report request, the UE 101-A, the UE 101-B, and the UE 101-C in group 1 are aware that they are not required to transmit path reports, and thus they will not transmit path reports.

For the third parameter, a number of UEs, if a UE receives a path report configuration or a path report request including a number of UEs, and the receiving UE is included, thus the UE can transmit a path report. For example, the UE 101-A in FIG. 2 receives a path report request, which includes the UE 101-A and the UE 101-B, thus the UE 101-A can transmit a path report. If the UE 101-C receives this path report request, it would not transmit the path report.

For the fourth parameter, an identity of the UE, it means that if a UE receives a path report configuration or a path report request with its own identity included, the UE can transmit the path report.

For the fifth parameter, conditions. If a UE receives a path report configuration or a path report request with one or more conditions, and the UE satisfies any one of the conditions, the UE can transmit the path report.

There are multiple types of conditions, one type of condition relates to the location of the UEs. Specifically, the conditions might include at least one of the following:
  i. the altitude, or the above ground level (AGL) altitude of the UE is larger than a threshold;
  ii. the altitude, or the above ground level (AGL) altitude of the UE is smaller than a threshold;
  iii. the UE is out of a vertical area;
  iv. the UE is out of a horizontal area;
  v. the distance, horizontal distance, vertical distance, and/or propagation delay between the UE and the BS is larger than a threshold;
  vi. the distance, horizontal distance, vertical distance, and/or propagation delay between the UE and the BS is smaller than a threshold;
  vii. the distance, horizontal distance, vertical distance, and/or propagation delay between the UE and another UE in the group is larger than a threshold, in particular, the distance between a primary UE and a secondary UE;

viii. the distance, horizontal distance, vertical distance, and/or propagation delay between the UE and another UE in the group is smaller than a threshold, in particular, the distance between a primary UE and a secondary UE;

ix. the distance, horizontal distance, and/or vertical distance between the UE and a reference location is larger than a threshold;

x. the distance, horizontal distance, and/or vertical distance between the UE and a reference location is smaller than a threshold;

xi. the average distance, horizontal distance, vertical distance, and/or propagation delay of the group of UEs to the BS is larger than a threshold;

xii. the average distance, horizontal distance, vertical distance, and/or propagation delay of the group of UEs to the BS is smaller than a threshold.

The second type of condition relates to time. Specifically, the time condition may be a time period, and the UE can transmit a path report periodically with the period. In other words, when the time after the last group path reporting is longer than the period, the UE can transmit a path report. The UE may set an expiration timer, wherein when the timer expires; the UE transmits a path report. The timer may be configured by the BS.

The third type of condition is group events. The group events may include: one or more UEs join or leave the UE group, or a task is assigned to the group of UEs. For example, when the UE group is assigned with a new task, this means the paths of the UEs are changed. At this time, the UEs can transmit the path report.

The fourth type of condition is the radio connection condition. This condition only applies to the secondary UE(s). When there is no connection between the secondary UE and the primary UE, i.e., no sidelink connection, or the quality of the link between the secondary UE and the primary UE is lower than a threshold, the secondary UE may transmit the path report to the BS. The secondary UE may also transmit the radio link failure to the BS.

Correspondingly, when there is no connection between the secondary UE and the BS, i.e., no cellular air interface, or the quality of the link between the secondary UE and the BS is lower than a threshold, the secondary UE transmits the path report to the primary UE. The secondary UE may also transmit the radio link failure to the primary UE.

The fifth type of condition is the report status condition of the UE group. For example, when a primary UE receives a path report from a secondary UE in the UE group, the primary UE can transmit a path report. When the number of path reports from UEs in the group is larger than a threshold, the primary UE can transmit a path report to the BS.

Figure 4:
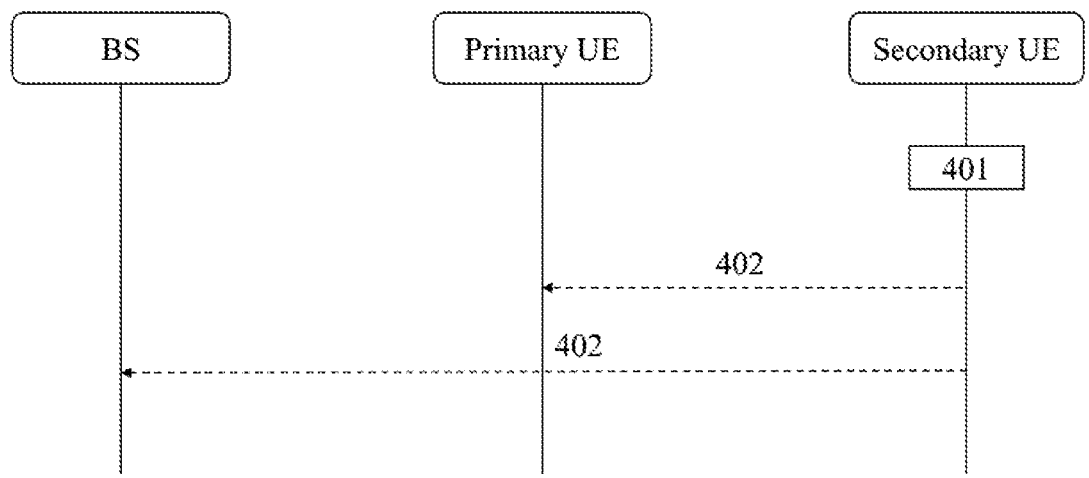
FIG. 4 illustrates a method performed by a secondary UE according to some embodiments of the subject disclosure.

FIG. 4 illustrates a method performed by a secondary UE according to a preferred embodiment of the subject disclosure.

In step 401, the secondary UE determines a destination based on a location requirement and/or a radio link condition, the destination may be the primary UE or the BS.

In step 402, the secondary UE transmits a secondary path report to the destination.

Under normal circumstances, the present disclosure configures that the secondary UE transmits the path report to the primary UE, and the primary UE transmits the group path report to the BS.

However, there are some exceptional cases, that the secondary UE may directly transmit the path report to the BS. The secondary UE may be configured to select a better link between the link of UE-to-BS (i.e., the link between the second UE and the BS) and the link of UE-to-UE (i.e., the link between the second UE to the primary UE).

For example, when the distance or a propagation delay between the secondary UE and the BS is smaller than a threshold, the secondary UE may transmit the path report to the BS directly. Alternatively, when a link quality between the secondary UE and a primary UE is lower than a threshold, the secondary UE may transmit the path report to the BS directly.

Correspondingly, when the distance or a propagation delay between the secondary UE and the primary UE is smaller than a threshold, the secondary UE may transmit the path report to the primary UE. Alternatively, when a link quality between the secondary UE and the BS is lower than a threshold, the secondary UE may transmit the path report to the primary UE.

The secondary UE may receive the path report configuration or the path report request from the BS or from the primary UE. The content of the path report configuration or the path report request is identical as explained as above.

Figure 5:
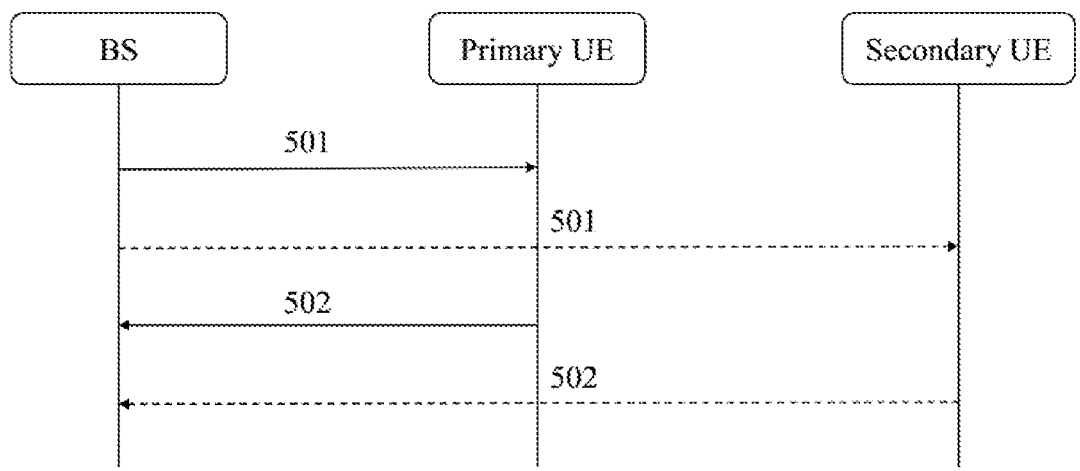
FIG. 5 illustrates a method performed by a BS according to some embodiments of the subject disclosure.

FIG. 5 illustrates a method performed by a BS according to a preferred embodiment of the subject disclosure. This method is performed in a system including a UE group, there is one primary UE and one or more secondary UEs in the UE group, and the primary UE controls the one or more secondary UEs.

In step 501, the BS transmits a path report configuration or a path report request to the UEs, which includes the primary UE and the secondary UE. The path report configuration or the path report request may be broadcasted to the UEs, for example, in a system information block, or it may be transmitted in dedicated signaling, e.g., RRC signaling.

In step 502, the BS receives the path report from the primary UE and/or the secondary UE.

The BS may configure or request for a multiple paths report, then the primary UE can transmit a group path report which includes multiple paths received from one or more secondary UEs, to the BS.

The BS may configure or request a common path report or a reference path report, then the primary UE can determine the common path report or the reference path report based on the multiple paths received from one or more secondary UEs, and transmit the group path report, which is the determined common path report or the determined reference path report, to the BS.

The BS may configure or request for an individual path report. In one preferred embodiment, the secondary UE can transmit the individual path report to the primary UE.

For a primary UE, it always transmits the path report to the BS, the path report may include a multiple paths report, a common path report or a reference path report, or the individual path report. For a secondary UE, the BS may further transmit an indicator to indicate the secondary UE to which destination the secondary UE can transmit the path report, i.e., whether the secondary UE can transmit the path report to the primary UE or to the BS.

The indicator may indicate: when the distance, horizontal distance, vertical distance, propagation delay between the secondary UE and the primary UE is smaller than a threshold, then the secondary UE can transmit the path report to the primary UE. When the distance, horizontal distance, vertical distance, and propagation delay between the secondary UE and the primary UE is larger than a threshold, then the secondary UE can transmit the path report to the BS.

Alternatively, the indicator may indicate: when the distance, horizontal distance, vertical distance, propagation delay between the secondary UE and the BS is smaller than a threshold, the secondary UE transmit the path report to the BS. When the distance, horizontal distance, vertical distance, and propagation delay between the secondary UE and the BS is larger than a threshold, the secondary UE can transmit the path report to the primary UE.

Alternatively, the indicator may indicate: when the link quality between the secondary UE and the BS is lower than a threshold, the secondary UE can transmit the path report to the primary UE; correspondingly, when the link quality between the secondary UE and the primary UE is lower than a threshold, the secondary UE can transmit the path report to the BS.

The path report configuration or the path report request transmitted by the BS may further include at least one of the following parameters: 1) a path report type; 2) a group identity; 3) a number of UEs; 4) an identity of the UE; and/or 5) conditions.

The first parameter, the path report type includes at least three types of path report, which are: 1) an individual path report; 2) multiple path reports; and 3) a common or reference path report. When a UE receives a path report configuration or a path report request which includes the first path report type, since the primary UE and the secondary UE are both able to transmit the individual path report, the primary UE and the secondary UE can thus transmit the individual path report. In one preferred embodiment, the secondary UE transmits the individual path report to the primary UE.

When a UE receives a path report configuration or a path report request including the second or the third path report type, since only the primary UE is able to transmit these two types of path reports, then only the primary UE can transmit the path report to the BS.

For the second parameter, a group identity, when a UE receives a path report configuration or a path report request with the group identity, the UE can check whether it is in the UE group with the group identity. If yes, the UE can transmit the path report, if not, the UE does not need to transmit the same. For example, in FIG. 2, group 1 includes the UE 101-A, the UE 101-B, and the UE 101-C. The BS broadcasts a path report configuration or a path report request including the group identity: group 2. Thus, after receiving this path report configuration or path report request, the UE 101-A, the UE 101-B, and the UE 101-C in group 1, are aware that they are not required to transmit the path report, and they will not transmit the path report.

For the third parameter, a number of UEs, if a UE receives a path report configuration or a path report request including a number of UEs, and the receiving UE is included, the UE can thus transmit the path report. For example, the UE 101-A in FIG. 2 receives a path report request, which includes the UE 101-A and the UE 101-B, the UE 101-A can thus transmit the path report. If the UE 101-C receives this path report request, it would not transmit the path report.

For the fourth parameter, an identity of the UE, this means that if a UE receives a path report configuration or a path report request with its own identity included, the UE can transmit the path report.

For the fifth parameter, conditions, if a UE receives a path report configuration or a path report request with one or more conditions, and the UE satisfies any one of the conditions, the UE can transmit the path report.

There are multiple types of conditions, one type of condition relates to the location of the UEs. Specifically, the conditions might include at least one of the following:
  i. the altitude, or the above ground level (AGL) altitude of the UE is larger than a threshold;
  ii. the altitude, or the above ground level (AGL) altitude of the UE is smaller than a threshold;
  iii. the UE is out of a vertical area;
  iv. the UE is out of a horizontal area;
  v. the distance, horizontal distance, vertical distance, and/or propagation delay between the UE and the BS is larger than a threshold;
  vi. the distance, horizontal distance, vertical distance, and/or propagation delay between the UE and the BS is smaller than a threshold;
  vii. the distance, horizontal distance, vertical distance, and/or propagation delay between the UE and another UE in the group is larger than a threshold, in particular, the distance between a primary UE and a secondary UE;
  viii. the distance, horizontal distance, vertical distance, and/or propagation delay between the UE and another UE in the group is smaller than a threshold, in particular, the distance between a primary UE and a secondary UE;
  ix. the distance, horizontal distance, and/or vertical distance between the UE and a reference location is larger than a threshold;
  x. the distance, horizontal distance, and/or vertical distance between the UE and a reference location is smaller than a threshold;
  xi. the average distance, horizontal distance, vertical distance, and/or propagation delay of the group of UEs to the BS is larger than a threshold;
  xii. the average distance, horizontal distance, vertical distance, and/or propagation delay of the group of UEs to the BS is smaller than a threshold.

The second type of condition relates to time. Specifically, the time condition may be a time period, and the UE can transmit a path report periodically with the period. In other words, when the time after the last group path reporting is longer than the period, the UE can transmit a path report. The BS may configure a timer, for instance, an expiration timer, and transmit it to the UE, and the UE can set the expiration timer, when the timer expires, then the UE transmits a path report.

The third type of condition is group events. The group events may include: one or more UEs join or leave the UE group, or a task is assigned to the group of UEs. For example, when the UE group is assigned with a new task, this means the paths of the UEs are changed. At this time, the UEs can transmit path reports.

The fourth type of condition is the radio connection condition. This condition only applies to the secondary UE. When there is no connection between the secondary UE and the primary UE, i.e., no sidelink connection, or the quality of the link between the secondary UE and the primary UE is lower than a threshold, the secondary UE may transmit the path report to the BS. The secondary UE may also transmit the radio link failure to the BS.

Correspondingly, when there is no connection between the secondary UE and the BS, i.e. no cellular air interface, or the quality of the link between the secondary UE and the BS is lower than a threshold, the secondary UE can transmit the path report to the primary UE. The secondary UE may also transmit the radio link failure to the primary UE.

The fifth type of condition is the report status condition of the UE group. For example, when a primary UE receives a path report from a secondary UE in the UE group, the primary UE can transmit a path report. When the number of path reports from UEs in the group is larger than a threshold, the primary UE can transmit a path report to the BS.

The BS may further indicate the content of the path report to the UE. For a multiple paths report, the BS may indicate that the content can include at least one of the following parameters: location information of one or more waypoints, the time to arrive at the waypoints, and the time interval between the waypoints for each path. The BS may further indicate that the content of the path report can include the QoS or QoE requirement, the intended network slices of the path or between waypoints for each path.

For a common path, or a reference path for the group, the BS may indicate that the content can include at least one of the following parameters: location information of one or more waypoints, the time to arrive at the waypoints, and the time interval between the waypoints, and the spatial scale for the common path or the reference path. The BS may further indicate that the content of the path report can include the QoS or QoE requirement, the intended network slices of the path or between waypoints for the common path or the reference path.

The BS may indicate that the content can include the total number of UEs in the UE group, the total number of UEs with paths in the group, or the total number of UEs with paths to report in the group.

In one embodiment, the primary UE may transmit an indicator to indicate the path report capability to the BS. The indicator may include at least one of the following content: i) the UE who is transmitting this indicator is a primary UE of a group of UEs; ii) the UE is capable of collecting path reports from one or more secondary UEs in the group and transmitting the group path report including these paths to the BS; and iii) the UE is also capable of collecting path reports from one or more secondary UEs in the group, determining a common path or a reference path of the group, then transmitting the determined common path or reference path to the BS.

The secondary UE may also transmit an indicator to indicate the path report capability to the BS or the primary UE. The indicator may include at least one of the following content: i) the UE who is transmitting this indicator is a secondary UE of a group of UEs; ii) the UE is capable of transmitting a path report to the primary UE or the BS; and iii) the UE is capable of transmitting a path report to the primary UE or the BS based on conditions.

In another embodiment, the primary UE may transmit an indicator to indicate the path report availability to the BS. The indicator may include at least one of the following content: i) the UE who is transmitting this indicator is a primary UE of a group of UEs; ii) the UE has a group path report to report, the group path report includes multiple paths; and iii) the UE has a group path report to report, the group path report includes a common path or a reference path.

The secondary UE may transmit an indicator to indicate the path report availability to the BS or the primary UE. The indicator may include at least one of the following content: i) the UE who is transmitting this indicator is a secondary UE of a group of UEs; ii) the UE has a path report to report; and iii) the UE has a path determined to report to the primary UE or the BS.

In another embodiment, the UEs in a group transmit path report according to the path report configuration or the path report request from the BS or from the primary UE.

When the BS transmits the path report configuration or the path report request to the primary UE, the primary UE may forward the path report configuration or the path report request to the secondary UEs, and the primary UE and the secondary UEs transmit the path report according to the path report configuration or the path report request.

The primary UE may determine the path report configuration or the path report request and transmit the same to the secondary UEs, then the secondary UEs transmit the path report according to the path report configuration or the path report request.

The path reports may be determined by pre-determined conditions, for example, some conditions in the specification, system information, or the like.

For the second UEs, the path report includes at least one of the following parameters: i) one or more waypoints; ii) time to arrive at the one or more waypoints; iii) time interval between the waypoints; iv) QoS or QoE requirement of the path or between waypoints; and v) intended network slices of the path or between waypoints.

For the primary UEs, the path report includes at least one of the following parameters: i) multiple paths including the primary path and/or one or more secondary paths; ii) one or more common/reference waypoints for the group; iii) the identities of UEs, the identities of UEs which has paths, or the identities of UEs which have path to report in the group; iv) time to arrive the one or more common/reference waypoints; v) time interval between common/reference waypoints; vi) QoS or QoE requirement of the group path or between common/reference waypoints; vii) intended network slices of the group path or between common/reference waypoints.

Figure 6:
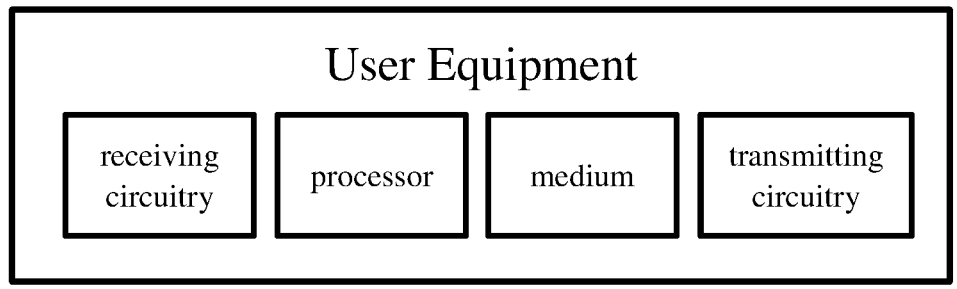
FIG. 6 illustrates a block diagram of a UE according to some embodiments of the subject disclosure.

FIG. 6 illustrates a block diagram of a UE according to the embodiments of the subject disclosure.

The BS may include receiving circuitry, a processor, and transmitting circuitry. In one embodiment, the UE may include a non-transitory computer-readable medium having stored thereon computer-executable instructions; receiving circuitry; transmitting circuitry; and a processor coupled to the non-transitory computer-readable medium, the receiving circuitry and the transmitting circuitry. The computer executable instructions can be programmed to implement a method (e.g., the method in FIG. 3) with the receiving circuitry, the transmitting circuitry and the processor. That is, upon performing the computer executable instructions, the receiving circuitry receives one or more secondary path reports, each including a secondary path of a corresponding secondary UE in the UE group; the processor determines a group path report based on a primary path of the primary UE and/or the one or more secondary paths; and the transmitting circuitry further transmits the group path report to a BS.

Figure 7:
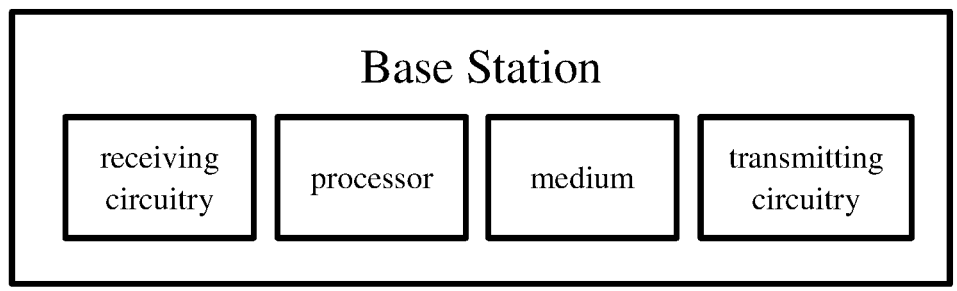
FIG. 7 illustrates a block diagram of a BS according to some embodiments of the subject disclosure.

FIG. 7 illustrates a block diagram of a BS according to the embodiments of the subject disclosure.

The BS may include receiving circuitry, a processor, and transmitting circuitry. In one embodiment, the UE may include a non-transitory computer-readable medium having stored thereon computer-executable instructions; receiving circuitry; transmitting circuitry; and a processor coupled to the non-transitory computer-readable medium, the receiving circuitry and the transmitting circuitry. The computer executable instructions can be programmed to implement a method (e.g., the method in FIG. 5) with the receiving circuitry, the transmitting circuitry and the processor. That is, upon performing the computer executable instructions, the transmitting circuitry transmits a path report configuration or a path report request, wherein the path report configuration or a path report request includes a path report type; and the receiving circuitry further receives one or more path reports.

In various embodiments, UAV hardware, firmware, and/or software may be modified, upgraded, and/or programmed to perform the functions, methods, and behaviors described herein. In some embodiments, software, hardware, and/or firmware may be created to interface with pre-existing UAV interfaces. In other embodiments, modifications to one or more portions of a UAV may be made to accomplish the described systems and methods. Hardware, firmware, and/or software may also be used in conjunction with a UAV to extend or replace its capabilities to implement any of the embodiments described herein.

The method of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A primary user equipment (UE) in a UE group for wireless communication, comprising:
   at least one memory; and
   at least one processor coupled with the at least one memory and operable to cause the primary UE to:
   receive one or more secondary path reports and one or more indicators from one or more secondary UEs in the UE group, each secondary path report including a secondary path of a corresponding secondary UE in the UE group, and the one or more indicators indicating at least one radio connection condition between the one or more secondary UEs and a Base Station (BS) is below a threshold;
   determine a group path report based on one or more of a primary path of the primary UE or the one or more secondary paths; and
   transmit the group path report to the BS.

2. The primary UE of claim 1, wherein the at least one processor is operable to cause the primary UE to:
   transmit one or more of a path report configuration or a path report request to one or more secondary UEs in the UE group, wherein the one or more of the path report configuration or the path report request is received from the BS or is determined by the primary UE.

3. The primary UE of claim 2, wherein the one or more of the path report configuration or the path report request includes one or more of a location requirement or a propagation delay requirement.

4. The primary UE of claim 2, wherein the one or more of the path report configuration or the path report request includes at least one of:
   a path report type;
   a UE group identity;
   a total number of UEs which are required to transmit path reports; or
   one or more identities of UEs which are required to transmit path reports.

5. The primary UE of claim 1, wherein the group path report comprises the one or more of the primary path or the one or more secondary paths.

6. The primary UE of claim 1, wherein the group path report comprises one or more of a common path or a reference path for the UE group based on the one or more of the primary path of the primary UE or the one or more secondary paths.

7. The primary UE of claim 1, wherein the at least one processor is operable to cause the primary UE to transmit the group path report when one or more of:
   a new UE joins the UE group;
   a UE leaves the UE group;
   a new path configuration is assigned to the UE group;
   a path report from a secondary UE other than the one or more secondary UEs in the UE group is received; or a total number of secondary path reports is over a threshold.

8. The primary UE of claim 1, wherein the at least one processor is operable to cause the primary UE to receive the one or more secondary path reports via a sidelink between the primary UE and corresponding one or more secondary UEs.

9. The primary UE of claim 1, wherein the group path report includes at least one of:
   parameters indicated in a group path report configuration or a group path report request;
   location information of waypoints;
   time information of waypoints;
   Quality of Service (QOS) requirement;
   Quality of Experience (QoE) requirement; or
   network slice of a path.

10. A secondary user equipment (UE) in a UE group for wireless communication, comprising:
    at least one memory; and
    at least one processor coupled with the at least one memory and operable to cause the secondary UE to:

determine a destination between a primary UE and a Base Station (BS) based on comparing one or more of:
- a radio connection condition between the secondary UE and the BS;
- a radio connection condition between the secondary UE and the primary UE; or
- one or more thresholds; and transmit a secondary path report to the destination.

11. The secondary UE of claim 10, wherein the at least one processor is operable to cause the secondary UE to:
transmit the secondary path report to the BS when one or more of a distance or a propagation delay between the secondary UE and the BS is smaller than a threshold.

12. The secondary UE of claim 10, wherein the at least one processor is operable to cause the secondary UE to:
transmit the secondary path report to the BS when a link quality between the secondary UE and the primary UE is lower than a threshold.

13. The secondary UE of claim 10, wherein the at least one processor is operable to cause the secondary UE apparatus to:
transmit the secondary path report to the primary UE when one or more of a distance or a propagation delay between the secondary UE and the primary UE is smaller than a threshold, or when the one or more of the distance or the propagation delay between the secondary UE and the primary UE is smaller than one or more of a distance or a propagation delay between the secondary UE and the BS.

14. The secondary UE of claim 10, wherein the at least one processor is operable to cause the secondary UE to:
transmit the secondary path report to the primary UE when one or more of a link quality between the secondary UE and the BS is lower than a threshold, or when the link quality between the secondary UE and the BS is lower than a link quality between the secondary UE and the primary UE.

15. The secondary UE of claim 10, wherein the at least one processor is operable to cause the secondary UE to:
receive a path report configuration or a path report request from the BS or from the primary UE.

16. A method performed by a primary user equipment (UE) in a UE group, the method comprising:
receiving one or more secondary path reports and one or more indicators from one or more secondary UEs in the UE group, each secondary path report including a secondary path of a corresponding secondary UE in the UE group, and the one or more indicators indicating at least one radio connection condition between the one or more secondary UEs and a Base Station (BS) is below a threshold;
determining a group path report based on one or more of a primary path of the primary UE or the one or more secondary paths; and
transmitting the group path report to the BS.

17. The method of claim 16, further comprising:
transmitting one or more of a path report configuration or a path report request to one or more secondary UEs in the UE group, wherein the one or more of the path report configuration or the path report request is received from the BS or is determined by the primary UE.

18. The method of claim 17, wherein the one or more of the path report configuration or the path report request includes one or more of a location requirement or a propagation delay requirement.

19. The method of claim 16, wherein the group path report comprises one or more of the primary path or the one or more secondary paths.

20. The method of claim 16, wherein the group path report comprises one or more of a common path or a reference path for the UE group based on one or more of the primary path of the primary UE or one or more secondary paths.

* * * * *